(12) United States Patent
Cherian et al.

(10) Patent No.: US 7,613,879 B2
(45) Date of Patent: Nov. 3, 2009

(54) METHOD, SYSTEM AND MEDIA FOR IMPROVED OPERATION OF A DEVICE IN A FOREIGN DOMAIN

(75) Inventors: Jacob Cherian, Austin, TX (US); Daniel Thom, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 405 days.

(21) Appl. No.: 11/626,845

(22) Filed: Jan. 24, 2007

(65) Prior Publication Data

US 2008/0177946 A1 Jul. 24, 2008

(51) Int. Cl.
*G06F 12/00* (2006.01)
(52) U.S. Cl. .................... 711/114; 711/112; 710/74
(58) Field of Classification Search ............. 711/114, 711/112; 710/74
See application file for complete search history.

(56) References Cited

U.S. PATENT DOCUMENTS

| 6,915,363 | B2 | 7/2005 | Wood et al. |
| 6,965,956 | B1 | 11/2005 | Herz et al. |
| 7,216,195 | B1 * | 5/2007 | Brown et al. ............. 710/316 |
| 2003/0115413 | A1 | 6/2003 | Wood et al. |
| 2005/0182874 | A1 | 8/2005 | Herz et al. |
| 2007/0223517 | A1 * | 9/2007 | Warren et al. ............. 370/463 |
| 2007/0271082 | A1 * | 11/2007 | Dominguez et al. ........ 703/20 |
| 2008/0005410 | A1 * | 1/2008 | Mies et al. ............... 710/62 |
| 2008/0126616 | A1 * | 5/2008 | Kumasawa et al. ........ 710/42 |

* cited by examiner

*Primary Examiner*—Christian P Chace
*Assistant Examiner*—Hashem Farrokh
(74) *Attorney, Agent, or Firm*—Pramudji Wendt & Tran, LLP

(57) ABSTRACT

A computer-readable medium having stored thereon executable instructions for performing a method comprising detecting presence of a SATA device in the process of spinning up, and creating a target which comprises default information relating to the SATA device.

18 Claims, 5 Drawing Sheets

METHOD, SYSTEM AND MEDIA FOR IMPROVED OPERATION OF A DEVICE IN A FOREIGN DOMAIN

BACKGROUND

1. Technical Field

The present disclosure relates generally to information handling systems, and more particularly, to improved operation of a device in a foreign domain.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An interface may be utilized for making hardware and data connections between any combination and number of devices, non-limiting examples of devices include IHS's, and components and peripherals therefor, and any combinations thereof. An interface connector refers to one of the pair of mating connectors that comprises an interface. The pair of connectors is sometimes referred to as a receptacle and plug, or female and male connectors, respectively.

There exists in the IHS industry a number of interface standards for making connections between any combination and number of devices, non-limiting examples of which include IHS's, components and peripherals therefore. As a non-limiting example, there exists the Advanced Technology Attachment (ATA) standards and the Small Computer System Interface (SCSI) standards. These standards define both the physical interface and the protocol used to communicate over the physical interface. Both standards have evolved over time through the release of new ATA and SCSI specifications, specifically, the Serial ATA (SATA) specification and the Serial Attached SCSI (SAS) specification. As used throughout this disclosure, reference to ATA, SCSI, SATA and SAS is intended to encompass all versions and releases of the associated specifications.

As used herein, a SAS device is a device that complies with the SAS specification and a SATA device is a device that complies with the SATA specification. As an artifact of the current standards, a SAS domain may accommodate both a SAS device and a SATA device.

In a SAS domain, both SAS and SATA disk drives may be connected to a RAID controller. The IO controller in the RAID controller implements a translation mechanism between ATA and SCSI command so that the RAID controller can interact with the SATA drive using SCSI commands.

After SAS discovery, the RAID controller may send initialization commands to discover the properties of devices that are in the SAS domain. During drive spin up, a SAS drive will respond to commands, and may provide the RAID controller with status information. In contrast, during spin up, a SATA drive will not respond to any commands until spin up is completed.

For a SATA drive connected to a RAID controller through a SAS expander, this lack of response from the SATA drive may result in the RAID controller completing the initialization process and failing to discover the SATA drive. This may result in a failed or degraded virtual disk configured on the RAID controller.

For a SATA drive directly connected to the RAID controller, this lack of response from the SATA drive may cause delays in the boot process. The I/O controller ("IOC") must pause its discovery process during the boot process in order to wait for the SATA drive to spin up.

SUMMARY

The following presents a general summary of some of the many possible embodiments of this disclosure in order to provide a basic understanding of this disclosure. This summary is not an extensive overview of all embodiments of the disclosure. This summary is not intended to identify key or critical elements of the disclosure or to delineate or otherwise limit the scope of the claims. The following summary merely presents some concepts of the disclosure in a general form as a prelude to the more detailed description that follows According to one non-limiting embodiment there is provided a method of operating a RAID controller. The method may include detecting presence of a second domain type device in the process of spinning up in a first domain. The method may also include creating a target that comprises default information relating to the second domain type device.

According to another non-limiting embodiment there is provided a RAID controller. The RAID controller may include an I/O processor, an I/O controller in communication with the processor, and firmware. The firmware comprises instructions that when executed may cause the I/O controller or I/O processor to detect presence of a second domain type device in the process of spinning up in a first domain, and/or create a target which comprises default information relating to the second domain type device.

According to another embodiment there is provided a computer-readable medium comprising executable instructions for performing a method comprising detecting presence of a second domain type device in the process of spinning up in a first domain, and creating a target which comprises default information relating to the second domain type device.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

The present disclosure relates broadly to operation of a device in a foreign domain. In a non-limiting embodiment, the present disclosure relates to operation of a SATA device in a SAS domain. This disclosure provides methods, apparatus and products to emulate the response of SATA disk drives to commands during spin up, the time during which the SATA drive is non-responsive to any commands.

According to some embodiments of the present disclosure, a RAID controller initializing before all SATA drives behind a SAS expander have completed spin up, will have adequate information about those drives and will therefore not complete initialization before they are spun up. This prevents any virtual disks from being failed or degraded due to missing drives.

According to other embodiments of the present disclosure, a RAID controller initializing while directly connected to SATA drives will not be forced to pause the drive discovery process until all SATA drives have completed spin up. Rather, the RAID controller will be able to proceed initializing any other SATA drives that have already spun up.

Figure 1:
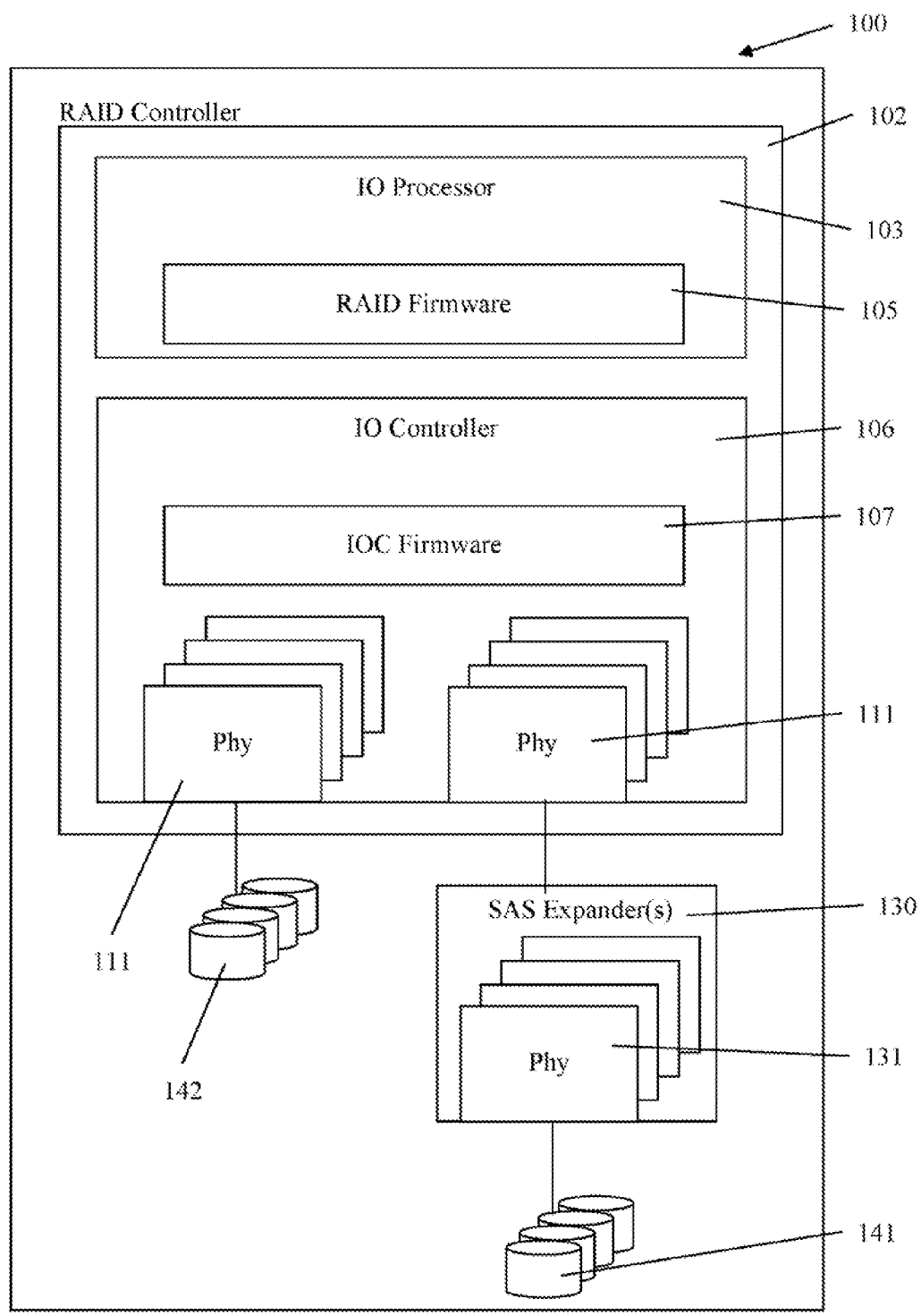
FIG. 1 is a schematic of a SAS RAID controller model.

Referring to FIG. 1, there is shown a schematic representation of SAS RAID controller system 100. RAID controller 102 may include I/O processor 103 having RAID firmware 105. RAID controller 102 may further include I/O controller 106 having IOC firmware 107, and a plurality of phy 111, which may be integrated into RAID controller 102 and provides the bridge between the digital and modulated parts of the interface. Any suitable number of SATA drives 142 may be directly connected to RAID controller 102 through phy 111. Any suitable number of SAS expanders 130 may be connected to RAID controller 102 though phy 111. Each SAS expander 130 may include one or more phys 131. Any suitable number of SATA drives 141 may be connected indirectly to RAID controller 102 through SAS expanders 130. The I/O controller in the RAID controller implements a translation mechanism between ATA and SCSI commands and presents a SCSI target and/or a SCSI logical unit for each attached SATA device, so that the RAID controller can interact with the SATA drive using SCSI commands.

Figure 2:
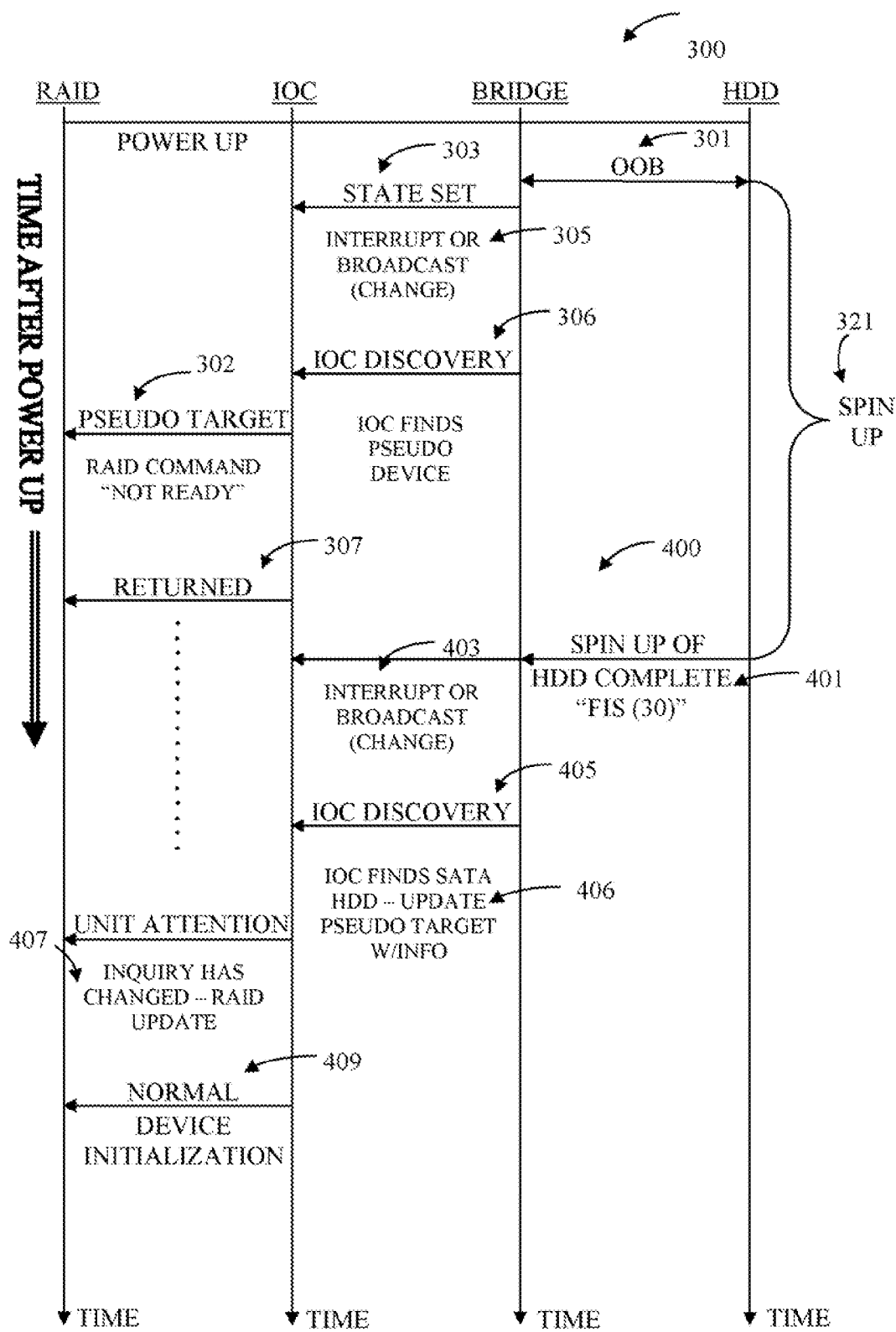
FIG. 2 there is shown an operational time line for a RAID controller system.

Referring to FIG. 2, there is shown an operational time line for SAS RAID controller model of FIG. 1. This operational time line may also be read in conjunction with the methods shown in FIGS. 3 and 4 below. Implementation of the methods of the present disclosure may include changes to present STP ("Serial ATA Tunneled Protocol")/SATA bridges (in SAS expanders and attached to IO controllers), the IO controller and/or IO controller firmware, and RAID controller firmware.

At power-on of drives 141 and/or 142, out of band (OOB) signaling procedure 301 allows for detection of any SATA device 141 or 142 connected directly or indirectly to phy 111. A SATA drive will not respond to any communications until drive spin up 321 is completed, at which point it may transmit an initial "Register—Device to Host "FIS, or "FIS(32)." Because a SATA drive is incapable of responding, the present disclosure provides step 303 in which the state of phy 111 may be set to indicate the presence of SATA device 141 or 142. For SATA drives 142 connected directly to local phys 111, this state indication 305 may take the form of an interrupt that is generated to indicate the presence of SATA drive 142. For those SATA drives 141 connected through expander 130 this indication 305 may take the form of a BROADCAST (CHANGE) 305.

During RAID controller 102 initialization, IOC firmware 107 may perform a topology discovery 306 that may detect whether or not SATA drives 141 or 142 has completed spin up 321. The IOC firmware 107 may recognize SATA drives that have not completed spin up and create a pseudo target 302 to expose to the RAID firmware 105. Pseudo target 302 is required because I/O controller 106 will not have information (vendor, device type and product information) about the attached device 141 or 142 until spin up 321 is completed and commands have been issued to the drives to get this information. In the practice of the present disclosure, a special programmable mode may be implemented for I/O controller 106 where it is assumed that all attached devices are disk drives 141 or 142. While not always true, this assumption is valid in most RAID environments.

As I/O controller 106 continues through discovery process 306, "not ready" communications may be returned in response to RAID 102 commands. In a non-limiting embodiment, I/O controller 106 may provide emulation for the response to commands from RAID 102 to the pseudo target. If RAID firmware 105 sends any other SCSI commands to the pseudo target as part of its initialization process, I/O controller firmware may respond with CHECK CONDITION Feb. 4, 2001, that is, "NOT READY—LOGICAL UNIT IS IN PROCESS OF BECOMING READY"

RAID firmware 105 may issue retries 307 to discover the device until device 141 or 142 actually becomes ready, or a pre-defined timeout expires.

In a non-limiting embodiment, I/O controller 106 may maintain pseudo target 302 until notified that SATA drive 141 or 142 is ready. This may occur once SATA drive 141 or 142 completes spin up 321 and transmission 401 of the initial FIS signal occurs.

As with state indication 305, RAID controller 102 may receive this initial FIS signal as a BROADCAST(CHANGE) for devices 141 connected through an expander 130 and as an interrupt for devices 142 directly attached. In a non-limiting example, once IOC firmware 107 has discovered drive 141 or 142 through the normal path, communication 407 of CHECK CONDITION 06/3SF/03 (UNIT ATTENTION—INQUIRY DATA HAS CHANGED) may be made to RAID firmware 105. RAID firmware 105 may then send another SCSI INQUIRY command 409 and proceed with initialization.

Figure 3:
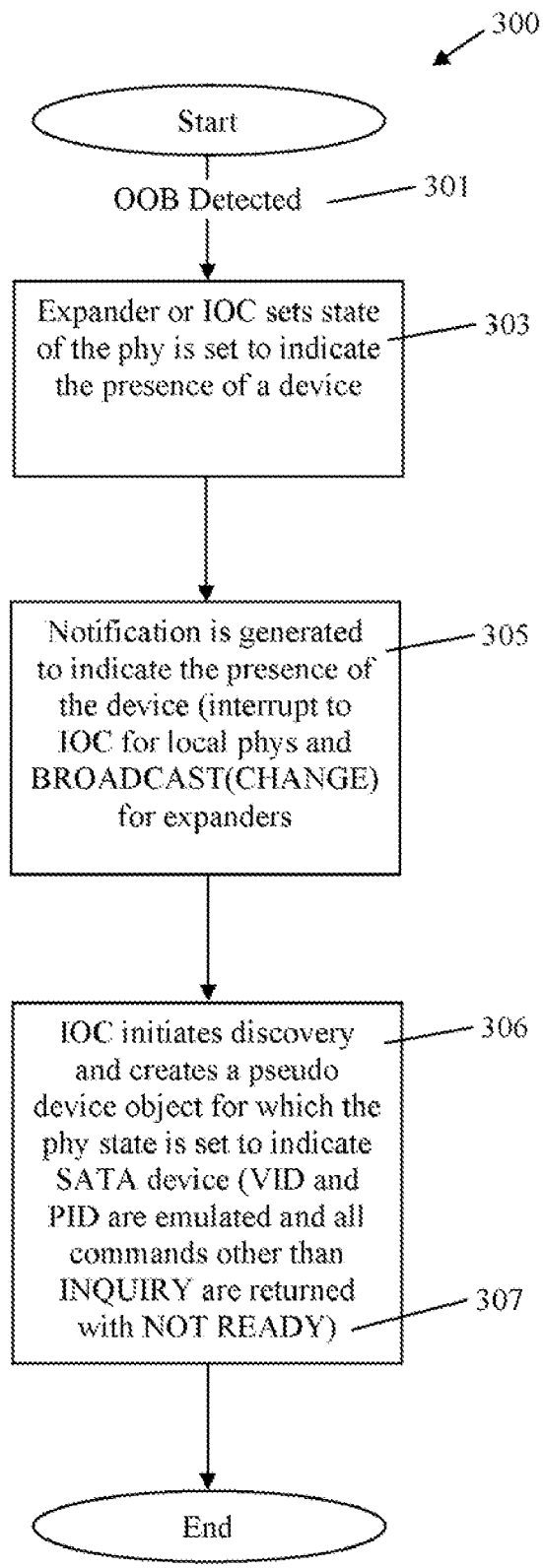
FIG. 3 is a schematic representation of a method for operating a controller system.

Referring now to FIG. 3 there is shown a schematic representation of a method for operating a controller system. Upon start-up of RAID controller, the OOB procedure 301 may detect presence of a SATA drive. In 303 the state of the phy may be set by the expander or I/O controller to indicate the presence of a device. The assumption may be made that it is a SATA disk drive. In 305 a notification may be generated to indicate the presence of the device. For local devices this notification may be an interrupt. For devices connected through an expander this notification may be BROADCAST (CHANGE). In 306 the I/O controller initiates discovery and may create a pseudo device object (pseudo target) which represents a SATA disk drive. In 307 the device may be emulated and information such as vendor identification (VID), device type and production identification (PID) are defaulted. During device spin up, all commands are returned with "Not Ready."

Figure 4:
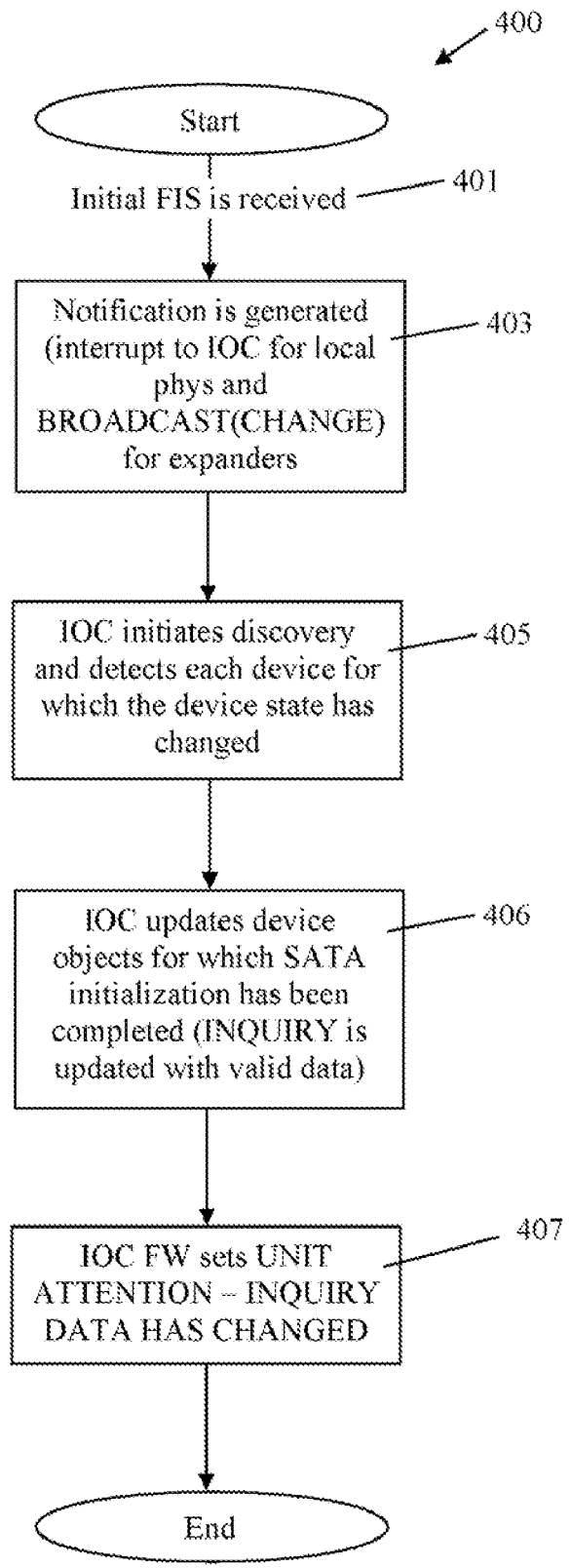
FIG. 4 is a schematic representation of a method for operating a controller system.

Referring now to FIG. 4, upon completion of device spin up, an initial FIS may be generated in 401. In 403, a notification may again be generated. As with step 305 above for local devices this notification is an interrupt. For devices connected through an expander this notification may be BROADCAST (CHANGE). In 405, the I/O controller initiates discovery and may detect each device for which device state has changed, that is, the device that has completed "spin up." In 406, the I/O controller may update device objects for which SATA initialization has been completed, and the target may be updated with valid data rather than with the defaulted VID, device type and PID. In 407, the IOC may set a status indicating this change has occurred. In 409 (FIG. 2), the RAID controller 102 may receive the status that inquiry data has changed.

Figure 5:
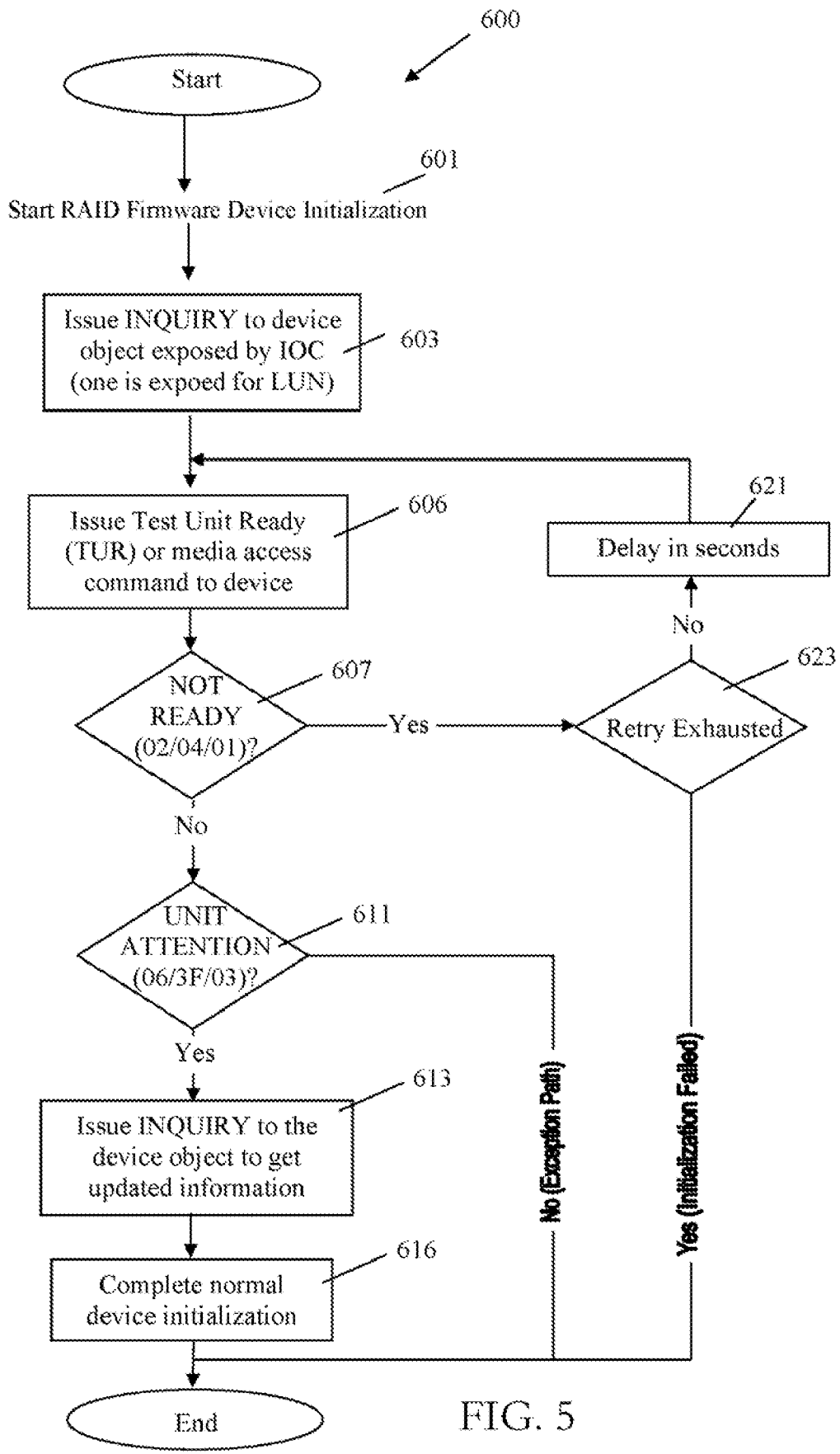
FIG. 5 is schematic representation of controller logic.

Referring now to FIG. 5, there is shown a schematic representation of RAID controller logic 600. In 601, the RAID device may be initialized. In 603, an inquiry maybe issued to the SATA device that is discovered by the I/O controller. In 605, a there may be an inquiry to determine if the SATA device is a pseudo device.

In 606, the RAID controller may issue a TUR (Test Unit Ready) or similar command to determine in 607 the ready status of the device. If the device is not ready logic 600 may loop through 623 and 621 until the retries are exhausted, there is a timeout, or the device is finally ready.

Once the device is ready, in 611 there may be a response to the TUR indicating that inquiry data has changed. If the data has changed, in 613 there may be an inquiry to get updated information. After obtaining the updated information, in 616 normal device initialization may be completed.

In non-limiting embodiments, part or all of the data structures described herein may be stored on one or more information handling system readable media or transmitted in a propagated signal.

In non-limiting embodiments, part or all of the methods described herein may be described as instructions for an information handling system, and stored on one or more information handling system readable media or transmitted by a propagated signal.

In non-limiting embodiments, an IHS may include IHS readable media having stored thereon instructions for part or all of the methods described herein, which may be executed by the IHS or another IHS.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

What is claimed is:

1. A method of operating a RAID controller, the method comprising
   detecting presence of a second domain type device while operating in a first domain, wherein the second domain type device is in the process of spinning up during initialization of the RAID controller; and
   creating a target to communicate with the RAID controller while the second domain type device is in the process of spinning up during initialization of the RAID controller, wherein the target comprises default information relating to the second domain type device.

2. The method of claim 1, wherein the RAID controller is a SAS domain type RAID controller, the first domain is SAS and the second domain is SATA.

3. The method of claim 2, further comprising:
   inquiring the availability of the SATA device to communicate with the RAID controller until it completes the process of spinning up.

4. The method of claim 3, further comprising;
   obtaining updated information relating to the SATA device following spin up of the SATA device.

5. The method of claim 4, further comprising:
   replacing the default information in the target with the updated information.

6. The method of claim 1, wherein the second domain type device, while in the process of spinning up, is unable to respond to commands from the RAID controller.

7. A RAID controller comprising:
   an I/O processor;
   an I/O controller in communication with the processor;
   firmware comprising instructions that when executed cause the I/O controller or I/O processor to:
   detect the presence of a second domain type device while operating in a first domain, wherein the second domain type device is in the process of spinning up during initialization of the RAID controller; and
   create a target to communicate with the RAID controller while the second domain type device is in the process of spinning up during initialization of the RAID controller, wherein the target comprises default information relating to the second domain type device in a first domain.

8. The RAID controller of claim 7, wherein the RAID controller is a SAS domain type RAID controller, the first domain is SAS and the second domain is SATA.

9. The RAID controller of claim 8, wherein the firmware comprises further instructions that when executed cause the I/O controller or I/O processor to:
   inquire about the availability of the SATA device to communicate with the RAID controller until it completes the process of spinning up.

10. The RAID controller of claim 9, wherein the firmware comprises further instructions that when executed cause the I/O controller or I/O processor to:
    obtain updated information relating to the SATA device following spin up of the SATA device.

11. The RAID controller of claim 10, wherein the firmware comprises further instructions that when executed cause the I/O controller or I/O processor to:
    replace the default information in the target with the updated information.

12. The RAID controller of claim 7, wherein the second domain type device, while in the process of spinning up, is unable to respond to commands from the RAID controller.

13. A computer-readable storage medium comprising executable instructions for performing a method comprising:
- detecting presence of a second domain type device while operating in a first domain, wherein the second domain type device is in the process of spinning up during initialization of the RAID controller; and
- creating a target to communicate with the RAID controller while the second domain type device is in the process of spinning up during initialization of the RAID controller, wherein the target comprises default information relating to the second domain type device.

14. The computer-readable storage medium of claim 13, wherein the first domain is SAS and the second domain is SATA.

15. The computer-readable storage medium of claim 14, wherein the instructions further comprise:
- inquiring the availability of the SATA device to communicate with the RAID controller until it completes the process of spinning up.

16. The computer-readable storage medium of claim 15, wherein the instructions further comprise:
- obtaining updated information relating to the SATA device.

17. The medium of claim 16, wherein the instructions further comprise:
- replacing the default information in the target with the updated information.

18. The computer-readable storage medium of claim 13, wherein the second domain type device, while in the process of spinning up, is unable to respond to commands from the RAID controller.

* * * * *